United States Patent
Kimball et al.

(10) Patent No.: US 7,929,483 B2
(45) Date of Patent: Apr. 19, 2011

(54) METHOD AND APPARATUS FOR PROVIDING A SECURE SYSTEM TIME

(75) Inventors: Bridget D. Kimball, Encinitas, CA (US); Michael T. Habrat, San Diego, CA (US); John I. Okimoto, San Diego, CA (US); Douglas M. Petty, San Diego, CA (US); Eric J. Sprunk, Carlsbad, CA (US); Lawrence W. Tang, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1385 days.

(21) Appl. No.: 11/026,413

(22) Filed: Dec. 30, 2004

(65) Prior Publication Data

US 2006/0146885 A1    Jul. 6, 2006

(51) Int. Cl.
*H04B 7/212* (2006.01)
(52) U.S. Cl. ........ 370/324; 370/350; 370/509; 713/155; 713/165
(58) Field of Classification Search ............. 370/503, 370/509, 512, 519; 711/163
See application file for complete search history.

(56) References Cited

U.S. PATENT DOCUMENTS

| | | | |
|---|---|---|---|
| 7,373,672 B2 * | 5/2008 | Un | 726/31 |
| 2002/0169970 A1 * | 11/2002 | Candelore | 713/193 |
| 2004/0223515 A1 * | 11/2004 | Rygielski et al. | 370/503 |
| 2005/0005114 A1 * | 1/2005 | Medvinsky | 713/168 |

OTHER PUBLICATIONS

Krebs; Synchronization system for internal clocks of synchronized devices, using satellite positioning system as time reference and receiver in central station which distributes received time signal to internal clocks May 23, 2002.*

* cited by examiner

*Primary Examiner* — Seema S Rao
*Assistant Examiner* — Henry Baron
(74) *Attorney, Agent, or Firm* — Stewart M. Wiener

(57) ABSTRACT

The present invention discloses a system and method for providing a secured system time reference to a subscriber device, e.g., a set top box or a receiver. In one embodiment, the system time reference is provided in a secure system time message that is broadcasted to a plurality of subscriber devices. Each subscriber device has a security device or software application that is capable of determining whether the received system time reference is legitimate. If the system time reference is determined to be legitimate, a local time reference is synchronized with said received system time reference.

16 Claims, 3 Drawing Sheets

METHOD AND APPARATUS FOR PROVIDING A SECURE SYSTEM TIME

BACKGROUND OF THE INVENTION

1. Field of the Invention

Embodiments of the present invention generally relate to digital rights management (DRM). More specifically, the present invention relates to a method and apparatus for providing a secure system time.

2. Description of the Related Art

Digital multimedia contents have gained wide acceptance in the public. As such, many consumers and businesses have digital media systems that enable the reception of such digital multimedia contents via various communication channels, e.g., via a wireless link such as a satellite link or a wired link such as cable connections and/or telephony based connections such as DSL and the like.

Irrespective of the communication channels that are employed to receive the digital multimedia contents, owners of multimedia contents and the service providers (e.g., a cable service provider, a telecommunication service provider, a satellite-based service provider) who provide such multimedia contents to subscribers are concerned with the protection of such digital multimedia contents. To illustrate, a service provider may receive a request from a subscriber to download a movie for viewing for a given period of time. This business arrangement is similar to going to a video store to rent the movie for a given period of time. Unlike the video store approach, the service provider can simply provide the requested movie electronically to a receiver of the subscriber for the requested period of time. Unlike the video store approach, the service provider does not need the subscriber to return the movie. However, the service provider does not want the subscriber to have the ability to view the movie after the given period of time has expired. As such, the notion of system time is one aspect that needs to be carefully defined and protected.

Thus, there is a need in the art for a method and apparatus for providing a secured system time.

SUMMARY OF THE INVENTION

In one embodiment, the present invention discloses an apparatus and method for providing a secured system time reference to a subscriber device, e.g., a set top box or a receiver. In one embodiment, the system time reference is provided in a secure system time message that is broadcasted to a plurality of subscriber devices. Each subscriber device has a security device or software application that is capable of determining whether the received system time reference is legitimate. If the system time reference is determined to be legitimate, a local time reference is synchronized with said received system time reference. In one embodiment, a time sequence number is also received by the security device to assist in the determination of legitimacy of the received system time reference.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

In one embodiment of the present invention, Digital Rights Management (DRM) may specify one or more usage rules pertaining to digital multimedia contents that have been downloaded and stored locally by subscribers, e.g., stored on a hard drive. One such usage rule is the length of time that a subscriber is allowed to access the stored digital multimedia contents (e.g., play the digital multimedia contents). The length of time or time window is configurable by a content or service provider, e.g., the length of time can be several hours, a day, several days, a week, and so on. In fact, the length of time can be associated with how much the subscriber is willing to pay for access to the multimedia contents.

Thus, a receiver of the subscriber generally has a security device or a software application that has access to a time reference to implement a time based usage rule. For example, the security device should be aware of the overall system time, so that it can regulate the usage of the received and stored multimedia contents.

Figure 1:
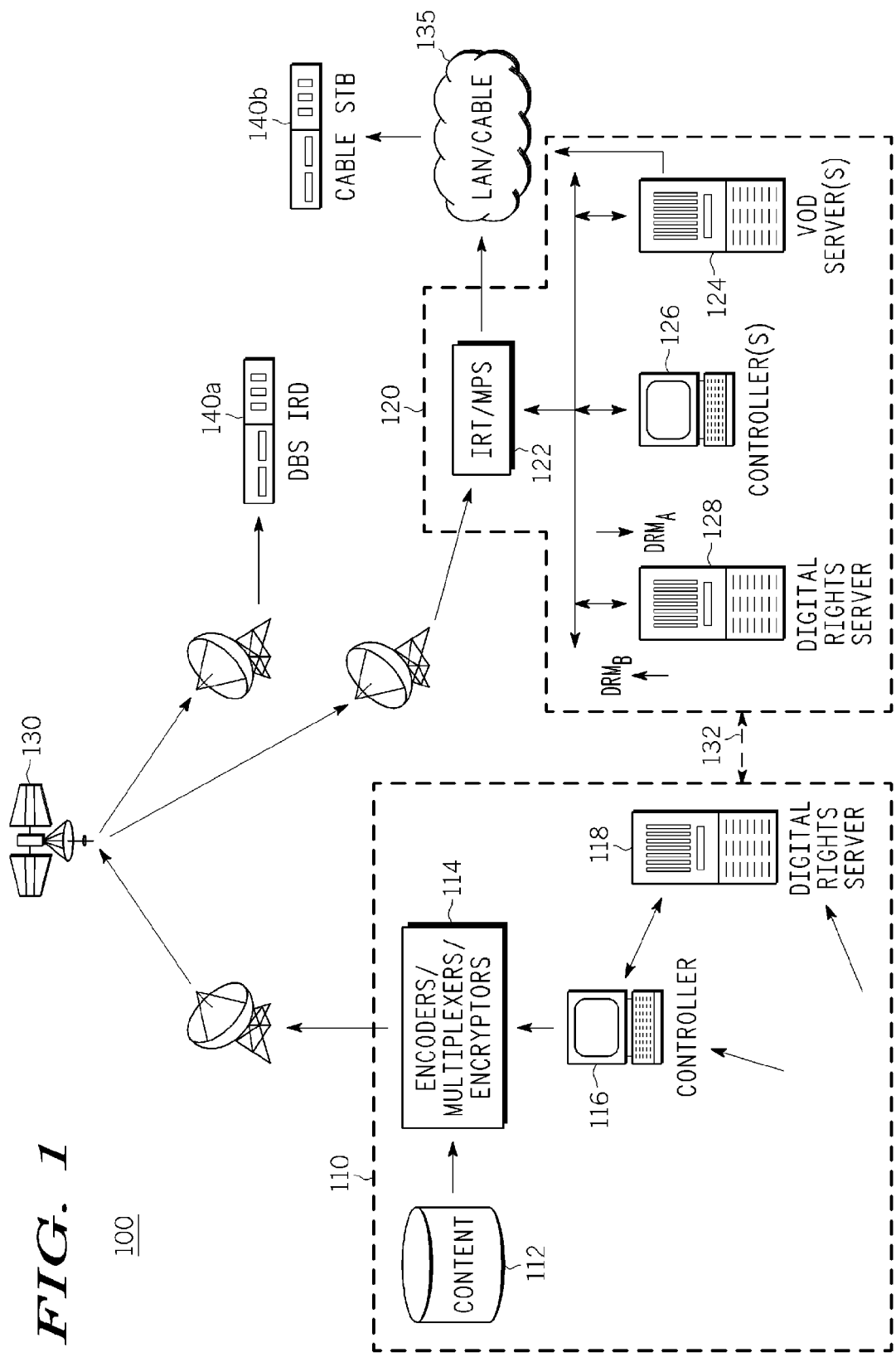
FIG. 1 illustrates a high level view of a digital multimedia content distribution system of the present invention.

FIG. 1 illustrates a high level view of a digital multimedia content distribution system 100 of the present invention. System 100 comprises a content provider 110, a service provider 120, a satellite transmission channel 130, an access network 135 and a plurality of subscriber devices 140*a* and 140*b*.

In one illustrative embodiment, the content provider 110 comprises a plurality of digital multimedia content 112, a plurality of encoders, multiplexers, encryptors 114, a controller 116 and a digital rights server (DRS) 118. Those skilled in the art will realize that the content provider 110 may implement additional components that are not shown in FIG. 1 to effect the transmission of multimedia contents.

In operation, DRS 118 provides digital rights control message (DRCM) to the controller 116. The digital rights control message may contain various rules pertaining to the protection of the digital multimedia contents that will be downloaded by subscribers. In one embodiment, rules of usage of the digital multimedia contents are included in the digital rights control message. In one embodiment, one of the rules of usage is a time-based usage rule that dictates a length of time that a subscriber will have to access the downloaded digital multimedia contents. In one embodiment, a secure system time message (SSTM) will be generated and sent to the subscriber to effect this time-based usage rule as further described below.

The controller 116 in accordance with the DRCM will cause multimedia contents 112 to be retrieved and processed into packets for transmission over a satellite communication channel 130. The processing may embody the usage of an encoder, an encryptor and/or a multiplexer with well known algorithms.

FIG. 1 illustrates two different scenarios where a subscriber receiving device 140*a* will receive the packets directly from the content provider 110 or a service provider 120 will receive the packets directly from the content provider 110. In one embodiment, the subscriber receiving device 140a can be situated at a consumer residence, whereas service provider 120 can be a cable company. It should be noted that the subscriber receiving device is broadly defined to be any device that has access to a persistent storage.

In the first scenario, content provider may have a direct relationship with a subscriber. As such, the packetized multimedia content is directly received by a subscriber device 140a, e.g., a direct broadcast system (DBS) receiver. In this arrangement, the secure system time message (SSTM) will be directly broadcasted by the content provider to the subscriber device 140a.

In the second scenario, the content provider 110 may have a direct relationship with a service provider 120, e.g., a cable company. As such, the packetized multimedia content is directly received by the service provider instead of a subscriber. In fact, although a wireless communication 130 is illustrated, a wired communication channel 132 can be used to forward multimedia content from the content provider 110 to the service provider 120. The service provider 120, in turn, may comprise an integrated receiver transcoder (IRT) and/or a modular processing system (MPS) 122, a video on demand (VOD) server 124, a controller 126, and a digital rights server 128. The received packetized multimedia is received by the integrated receiver transcoder (IRT) and/or a modular processing system (MPS) 122 which can be used to multiplex the packetized multimedia content with other services. These other services can be implemented under the control of controller 126, digital rights server 128 and VOD server 124.

To illustrate, the content provider 110 may be a film studio or a multimedia content clearing house that is sending protected multimedia content for distribution by the service provider 120 to its subscribers. As such, the service provider 120 may implement additional digital rights management requirements on top of the requirements demanded by the content provider 110. Alternatively, the service provider 120 may be tasked by the content provider 110 to implement jointly agreed digital rights management requirements, so that the content provider is only tasked with sending the protected multimedia contents to the service provider. Thus, it is up to the service provider to send the secure system time message (SSTM) to its subscribers to enforce the time-based usage rule associated with each use of the multimedia content.

Alternatively, the provider 110 may represent a satellite service provider, who takes content from various content providers, and aggregates it for distribution. In one embodiment, the satellite provider is still required to obey and convey the rules defined for the content by the content provider.

In one embodiment, the service provider will use an access network 135, e.g., a LAN, a cable network, a DSL network and the like, to send the digital multimedia contents to the subscribers. In one embodiment, the subscriber receiving device 140b is a cable set top box or a receiver. The subscriber device 140b will have a security device that is capable of enforcing rules of usage for the multimedia contents as defined by the service provider.

Figure 2:
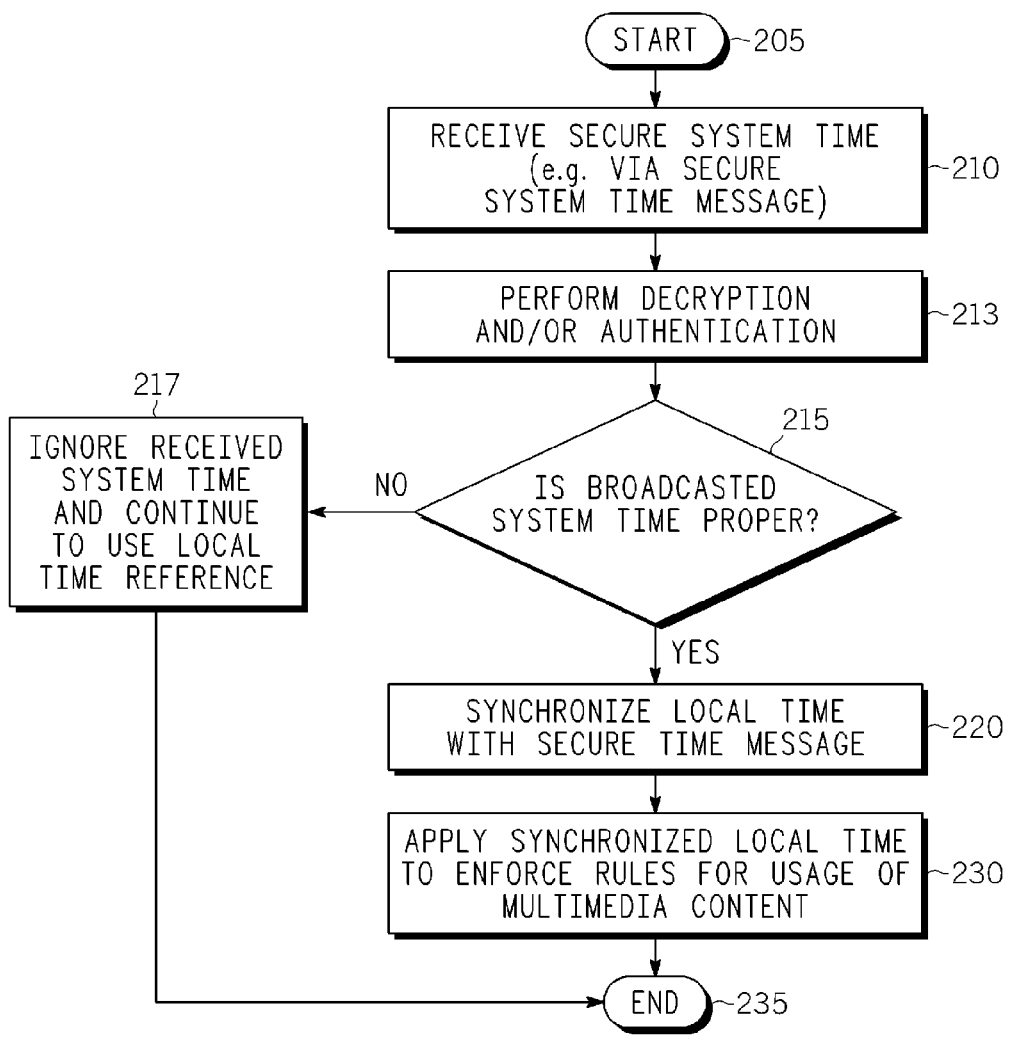
FIG. 2 illustrates a method for providing secure system time in accordance with the present invention.

FIG. 2 illustrates a method 200 for providing secure system time in accordance with the present invention. In order for a subscriber device 140a or 140b to enforce time based usage rules, it is necessary for the subscriber devices to have access to a reliable time reference. For example, a subscriber device may have access to a local clock reference. However, it is necessary for this local clock reference to be synchronized with a system time reference so that a time based usage rule can be properly and uniformly enforced. Additionally, tampering with this local clock reference can be achieved by pirates who may wish to circumvent the time based usage rule. For example, tampering can be achieved if the system time message is not properly secured, i.e., encrypted or authenticated.

Method 200 starts in step 205 and proceeds to step 210. In step 210, a subscriber device will receive a broadcasted secure system time reference, e.g., in the form of a secure system time message (SSTM). In one embodiment, the SSTM is encrypted and/or authenticated using any know encryption and/or authentication algorithms prior to being broadcasted to the subscriber device.

In step 213, the subscriber receiving device will employ a complementary decryption and/or authentication algorithm to decrypt the SSTM. Additionally, the SSTM is broadcasted periodically to all the subscriber devices, where the period of broadcast can be varied to further thwart pirates from intercepting or disrupting the SSTM transmissions.

In step 215, method 200 queries whether the broadcasted system time is proper or legitimate. In one embodiment, the present invention inserts a time sequence number in addition to the system time into the SSTM. This time sequence number allows the security device in the subscriber device to distinguish proper SSTMs from improper SSTMs. In other words, once the security device has recovered the broadcasted system time reference from the SSTM, it must use the time sequence number to determine whether to synchronize the local clock reference with the broadcasted system time reference. The use of the time sequence number will be described below.

If the query in step 215 is answered negatively, method 200 will proceed to step 217, where the recently received system time reference will be discarded and the security device will continue to use the local clock reference. If the query is positively answered, then method 200 will proceed to step 220.

In step 220, method 200 will synchronize the local clock reference to the recently received system time reference. Namely, if the received system time is Sunday, 1:00am and the local time reference is Saturday, 11:55pm, then the local clock reference will be updated to reflect Sunday, 1:00am. In one embodiment of the present invention, the system time reference is intentionally set to be slightly behind "real" time. The reason is to provide the subscribers with a small amount of additional time to access the multimedia contents, thereby ensuring customer satisfaction.

In step 230, method 200 will then apply the synchronized local time reference to enforce time base usage rule. Method 200 then ends in step 235.

Table 1 below provides a set of rules for evaluating the secure system time message to determine whether the SSTM is proper or legitimate. To assist understanding of the present invention, a plurality of cases is illustrated to show how the SSTM can be evaluated.

TABLE 1

| Case | $Time_{SSTM}$ | $TSN_{SSTM}$ | Security device Action |
|------|---------------|--------------|------------------------|
| a. | $>Time_L$ | $=TSN_L$ | Security device accepts the SSTM - $Time_L = Time_{SSTM}$, $TSN_L$ is unchanged |
| b. | $>Time_L$ | $<TSN_L$ | Security device rejects SSTM because $TSN_{SSTM} < TSN_L$ |
| c. | $>Time_L$ | $=TSN_L + 1$ | Security device accepts the SSTM - $Time_L = Time_{SSTM}$, $TSN_L = TSN_{SSTM}$ |
| d. | $>Time_L$ | $>TSN_L + 1$ | Security device rejects SSTM because $TSN_{SSTM} > TSN_L + 1$ |

TABLE 1-continued

| Case | Time$_{SSTM}$ | TSN$_{SSTM}$ | Security device Action |
|------|---------------|--------------|------------------------|
| e. | ≦Time$_L$ | =TSN$_L$ | Security device rejects SSTM because Time$_{SSTM}$ ≦ Time$_L$ |
| f. | ≦Time$_L$ | <TSN$_L$ | Security device rejects SSTM because TSN$_{SSTM}$ < TSN$_L$ |
| g. | ≦Time$_L$ | =TSN$_L$ + 1 | Security device accepts Time$_{SSTM}$ Time$_L$ = Time$_{SSTM}$, TSN$_L$ = TSN$_{SSTM}$ |
| h. | ≦Time$_L$ | >TSN$_L$ + 1 | Security device rejects SSTM because TSN$_{SSTM}$ > TSN$_L$ + 1 |

In Case a, the system time, Time$_{SSTM}$ recovered from the SSTM is greater than a local time reference Time$_L$, and the time sequence number TSN$_{SSTM}$ recovered from the SSTM is equal to a locally stored time sequence number TSN$_L$. In this scenario, the security device on the subscriber device will deem the system time, Time$_{SSTM}$ to be legitimate or proper. As a result, the local time reference Time$_L$ will be synchronized with the system time, Time$_{SSTM}$ and the locally stored time sequence number TSN$_L$ will remain the same. Case a is considered to be a normal operation.

In Case b, the system time, Time$_{SSTM}$ recovered from the SSTM is greater than a local time reference Time$_L$, and the time sequence number TSN$_{SSTM}$ recovered from the SSTM is less than a locally stored time sequence number TSN$_L$. In this scenario, the security device on the subscriber device will deem the system time, Time$_{SSTM}$ to be illegitimate or improper. As a result, the local time reference Time$_L$ will not be synchronized with the system time. In one embodiment of the present invention, the security device is programmed to reject any SSTMs where the time sequence number TSN$_{SSTM}$ recovered from the SSTMs is less than a locally stored time sequence number TSN$_L$.

In Case c, the system time, Time$_{SSTM}$ recovered from the SSTM is greater than a local time reference Time$_L$, and the time sequence number TSN$_{SSTM}$ recovered from the SSTM is greater than a locally stored time sequence number TSN$_L$ by a predefined value (e.g., by 1 in this example, but the increment value can be arbitrarily set). In this scenario, the security device on the subscriber device will deem the system time, Time$_{SSTM}$ to be legitimate or proper. As a result, the local time reference Time$_L$ will be synchronized with the system time, Time$_{SSTM}$ and the locally stored time sequence number TSN$_L$ will be synchronized with the time sequence number TSN$_{SSTM}$ recovered from the SSTM. Case c is considered to be a normal operation that will likely occur during provisioning, e.g., a first entry into the network.

In Case d, the system time, Time$_{SSTM}$ recovered from the SSTM is greater than a local time reference Time$_L$, and the time sequence number TSN$_{SSTM}$ recovered from the SSTM is greater than a locally stored time sequence number TSN$_L$ by an amount that is inconsistent with a predefined increment (e.g., greater than 1 in this example). In this scenario, the security device on the subscriber device will deem the system time, Time$_{SSTM}$ to be illegitimate or improper. As a result, the local time reference Time$_L$ will not be synchronized with the system time.

In Case e, the system time, Time$_{SSTM}$ recovered from the SSTM is less than or equal to a local time reference Time$_L$, and the time sequence number TSN$_{SSTM}$ recovered from the SSTM is equal to a locally stored time sequence number TSN$_L$. In this scenario, the security device on the subscriber device will deem the system time, Time$_{SSTM}$ to be illegitimate or improper. As a result, the local time reference Time$_L$ will not be synchronized with the system time. This scenario is considered to be a "replay attack", where a previously broadcasted SSTM is being sent again by a pirate to the security device of the subscriber device.

In Case f, the system time, Time$_{SSTM}$ recovered from the SSTM is less than or equal to a local time reference Time$_L$, and the time sequence number TSN$_{SSTM}$ recovered from the SSTM is less than a locally stored time sequence number TSN$_L$. In this scenario, the security device on the subscriber device will deem the system time, Time$_{SSTM}$ to be illegitimate or improper. As a result, the local time reference Time$_L$ will not be synchronized with the system time. This scenario may be considered to be a "replay attack", where again a previously broadcasted SSTM is being sent again by a pirate to the security device of the subscriber device.

In Case g, the system time, Time$_{SSTM}$ recovered from the SSTM is less than or equal to a local time reference Time$_L$, and the time sequence number TSN$_{SSTM}$ recovered from the SSTM is greater than a locally stored time sequence number TSN$_L$ by a predefined increment (e.g., 1 in this example). In this scenario, the security device on the subscriber device will deem the system time, Time$_{SSTM}$ to be legitimate or proper. As a result, the local time reference Time$_L$ will be synchronized with the system time, Time$_{SSTM}$ and the locally stored time sequence number TSN$_L$ will be synchronized with the time sequence number TSN$_{SSTM}$ recovered from the SSTM. Case g is considered to be a unique operation where the local clock reference is being rolled back. Although rolling back a local clock reference is rare, there may be situation where it is necessary due to a network problem. Rolling back the local clock reference should be evaluated with caution because a pirate will likely attempt to circumvent the time based usage rule by tampering with the local clock reference. However, the present invention via the use of a time sequence number will thwart such attempts.

In Case h, the system time, Time$_{SSTM}$ recovered from the SSTM is less than or equal to a local time reference Time$_L$, and the time sequence number TSN$_{SSTM}$ recovered from the SSTM is greater than a locally stored time sequence number TSN$_L$ by an amount that is inconsistent with a predefined increment (e.g., greater than 1 in this example). In this scenario, the security device on the subscriber device will deem the system time, Time$_{SSTM}$ to be illegitimate or improper. As a result, the local time reference Time$_L$ will not be synchronized with the system time.

Although the examples above describe a predefined increment associated with the time sequence number, the present invention is not so limited. It is possible to define a predefined decrement instead. In other words, a predefined difference value can be defined as a predefined increment or a predefined decrement. However, if a predefined decrement is employed, then the rules as described above would have to be adjusted accordingly. The use of a predefined increment or a predefined decrement is application specific.

Figure 3:
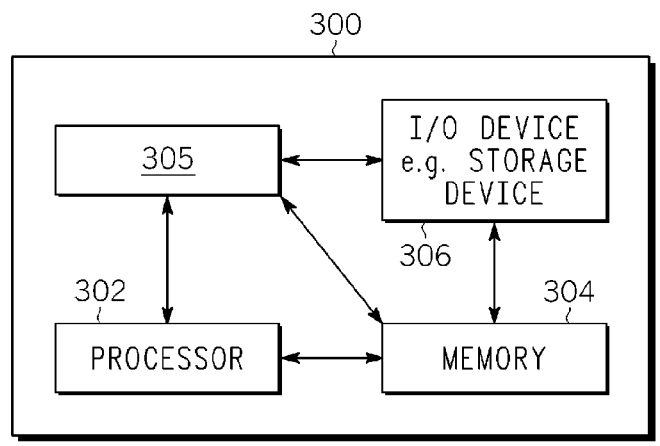
FIG. 3 illustrates the present invention implemented using a general purpose computer.
Figure 4:
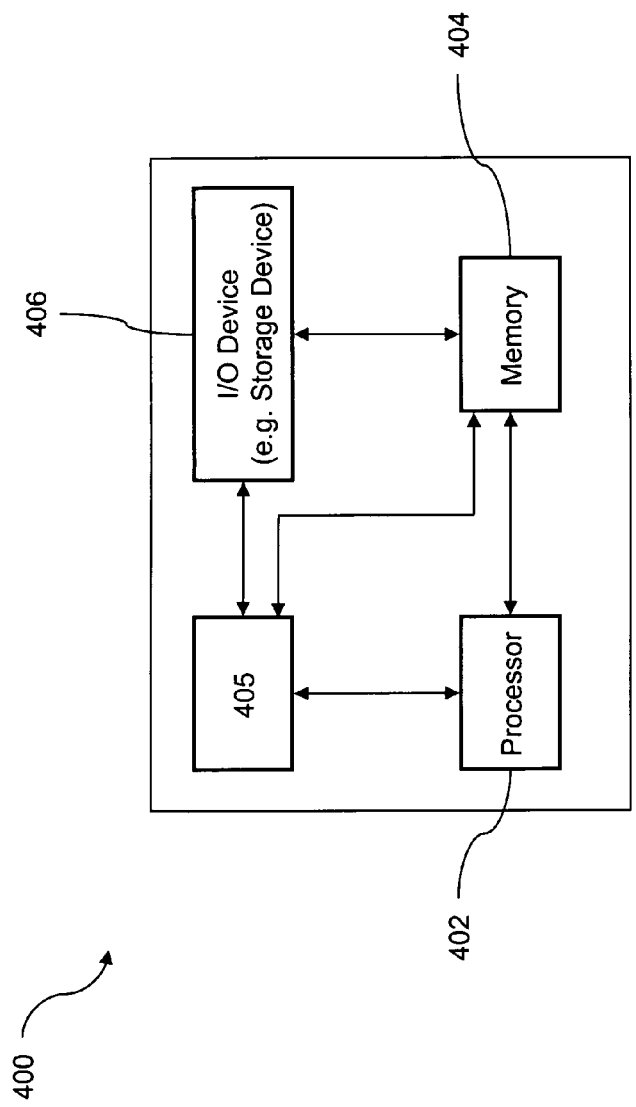

FIG. 3 is a block diagram of the present subscriber device being implemented with a general purpose computer. In one embodiment, the subscriber device 300 is implemented using a general purpose computer or any other hardware equivalents. For example, subscriber device 300 can be broadly implemented as a receiver 140a and/or set top box 140b of FIG. 1. More specifically, the subscriber device 300 comprises a processor (CPU) 302, a memory 304, e.g., random access memory (RAM) and/or read only memory (ROM), a security device 305 for analyzing SSTM as described above, and various input/output devices 306 (e.g., storage devices, including but not limited to, a tape drive, a floppy drive, a hard disk drive or a compact disk drive, a receiver, a decoder, a decryptor, a transmitter, a clock, a speaker, a display, an output port, a user input device (such as a keyboard, a keypad, a mouse, and the like), or a microphone for capturing speech commands).

It should be understood that the security device 305 can be implemented as a physical device or subsystem that is coupled to the CPU 302 through a communication channel. Alternatively, the security device 305 can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory 304 of the computer. As such, the security device 305 (including associated data structures and methods employed within the encoder) of the present invention can be stored on a computer readable medium or carrier, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

The invention claimed is:

1. A method for processing a system time reference, said method comprising:
   receiving, by a subscriber receiving device, a system time reference and a time sequence number from a content provider;
   determining whether said system time reference received from said content provider is legitimate, wherein said determining uses said received time sequence number to determine whether said system time reference is legitimate; and
   synchronizing a local clock reference of said subscriber receiving device to said system time reference if said system time reference is determined to be legitimate.

2. The method of claim 1, wherein said system time reference is received in a secure system time message.

3. The method of claim 2, wherein said secure system time message is a broadcasted message.

4. The method of claim 2, wherein said secure system time message is an encrypted or authenticated message.

5. The method of claim 1, wherein said determining comprises:
   determining said system time reference to be legitimate if: 1) said received time sequence number is equal to a locally stored time sequence number, and 2) said system time reference is greater than said local clock reference.

6. The method of claim 1, wherein said determining comprises:
   determining said system time reference to be legitimate if: 1) said received time sequence number is different from a locally stored time sequence number by a predefined difference value, and 2) said system time reference is greater than said local clock reference.

7. The method of claim 1, wherein said determining comprises:
   determining said system time reference to be legitimate if: 1) said received time sequence number is different from a locally stored time sequence number by a predefined difference value, and 2) said system time reference is less than or equal to said local clock reference.

8. The method of claim 1, further comprising:
   using said local clock reference to enforce a time based usage rule of a locally stored multimedia content.

9. A non-transitory computer-readable medium having stored thereon a plurality of instructions, the plurality of instructions including instructions which, when executed by a processor, cause the processor to perform steps for processing a system time reference, the steps comprising:
   receiving a system time reference; receiving a time sequence number; determining whether said system time reference is legitimate, wherein said determining uses said received time sequence number to determine whether said system time reference is legitimate; and
   synchronizing a local clock reference to said system time reference if said system time reference is determined to be legitimate.

10. The non-transitory computer-readable medium of claim 9, wherein said system time reference is received in a secure system time message.

11. The non-transitory computer-readable medium of claim 10, wherein said secure system time message is a broadcasted message.

12. The non-transitory computer-readable medium of claim 10, wherein said secure system time message is an encrypted or authenticated message.

13. The non-transitory computer-readable medium of claim 9, wherein said determining comprises:
   determining said system time reference to be legitimate if: 1) said received time sequence number is equal to a locally stored time sequence number, and 2) said system time reference is greater than said local clock reference; or
   determining said system time reference to be legitimate if: 1) said received time sequence number is different from a locally stored time sequence number by a predefined difference value, and 2) said system time reference is greater than said local clock reference; or
   determining said system time reference to be legitimate if: 1) said received time sequence number is different from a locally stored time sequence number by a predefined difference value, and 2) said system time reference is less than or equal to said local clock reference.

14. The non-transitory computer-readable medium of claim 9, the steps further comprising:
   using said local clock reference to enforce a time based usage rule of a locally stored multimedia content.

15. An apparatus for processing a system time reference, said apparatus comprising:
   a subscriber receiving device for receiving a system time reference and a time sequence number from a content provider; and
   a processor of said subscriber receiving device, the processor being configured to:
      determine whether said system time reference received from said content provider is legitimate, wherein said determining uses said received time sequence number to determine whether said system time reference is legitimate, and
      synchronize a local clock reference to said system time reference if said system time reference is determined to be legitimate.

16. The apparatus of claim 15, where said subscriber receiving device is at least one of a set top box and a receiver.

* * * * *